(12) United States Patent  
Wu

(10) Patent No.: US 8,224,603 B2
(45) Date of Patent: Jul. 17, 2012

(54) FREQUENCY OFFSET ESTIMATING APPARATUS AND ESTIMATING METHOD THEREOF

(75) Inventor: Shan Tsung Wu, Taipei (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 482 days.

(21) Appl. No.: 12/419,620

(22) Filed: Apr. 7, 2009

(65) Prior Publication Data

US 2009/0257534 A1    Oct. 15, 2009

(30) Foreign Application Priority Data

Apr. 9, 2008 (TW) ................................ 97112844 A

(51) Int. Cl.
    *G01R 13/00* (2006.01)
    *G01R 23/00* (2006.01)
    *G01R 23/16* (2006.01)
(52) U.S. Cl. ................ 702/75; 702/66; 702/76; 702/77; 375/261
(58) Field of Classification Search .................... 702/66, 702/75, 76, 77; 375/261
    See application file for complete search history.

(56) References Cited

U.S. PATENT DOCUMENTS

| 6,218,896 | B1* | 4/2001 | Becker et al. ............. 329/304 |
| 7,254,189 | B1* | 8/2007 | Kazakevich et al. ........ 375/326 |
| 7,271,660 | B1* | 9/2007 | Carroll .................... 330/292 |
| 2005/0036564 | A1* | 2/2005 | Peter et al. ............. 375/260 |
| 2007/0268978 | A1* | 11/2007 | Kazakevich et al. ........ 375/261 |

FOREIGN PATENT DOCUMENTS

CN    1385019    12/2002

OTHER PUBLICATIONS

Turin, William, "Unidirectional and Parallel Baum-Welch Algorithms," Nov. 1998, IEEE Transactions on Speech and Audio Processing, vol. 6, No. 6, pp. 516-523.*

* cited by examiner

*Primary Examiner* — Janet Suglo
(74) *Attorney, Agent, or Firm* — WPAT., P.C.; Justin King

(57) ABSTRACT

A frequency offset estimating apparatus includes an nth power computing module and a spectrum analyzing module. By raising a received signal to nth power to generate an nth power signal and analyzing the spectrum of the nth power signal, the present invention is capable of quickly and accurately estimating a frequency offset of the received signal. As being unaffected by channel characteristics, the estimating frequency offset apparatus is suitable for all channel environments.

11 Claims, 3 Drawing Sheets

FREQUENCY OFFSET ESTIMATING APPARATUS AND ESTIMATING METHOD THEREOF

CROSS REFERENCE TO RELATED PATENT APPLICATION

This patent application is based on a Taiwan, R.O.C. patent application No. 097112844 filed on Apr. 9, 2008.

FIELD OF THE INVENTION

The present invention relates to a frequency offset estimating apparatus and an estimating method thereof, more particularly, to an estimating apparatus obtaining a frequency offset using spectrum analysis, and an estimating method thereof.

BACKGROUND OF THE INVENTION

A common communication system transmits signals by loading the signals on high-frequency carrier waves. The signals are amplified or down-converted by a tuner at a receiving end, and subsequently demodulated by a demodulator. However, due to factors such as machinery aging or performance errors, the tuner becomes incapable of providing stable down-conversion to result in frequency offset along with time variations. In a conventional solution commonly used for frequency offset, a frequency offset is steadily estimated by iteration. However, in serious situations of channel fading and frequency offset, such conventional solution requires a relatively long period to conclude an estimated value, and is considered as rather limiting in actual practice.

SUMMARY OF THE INVENTION

Therefore, an objective of the invention is to provide a frequency offset estimating apparatus and an estimating method thereof, which are capable of quickly and accurately estimating a frequency offset of an input signal. As being unaffected by channel characteristics, the frequency offset estimating apparatus is suitable for all channel environments.

A frequency offset estimating method according to one embodiment of the invention comprises steps of generating a nth power signal by raising a received signal to nth power, and analyzing a spectrum of the nth power signal to obtain a frequency offset.

A frequency offset estimating apparatus according to another embodiment of the invention comprises an nth power computing module, and a spectrum analyzing module. The nth power computing module generates a nth power signal by raising a received signal to nth power. The spectrum analyzing module analyzes a spectrum of the nth power signal to obtain a frequency offset.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
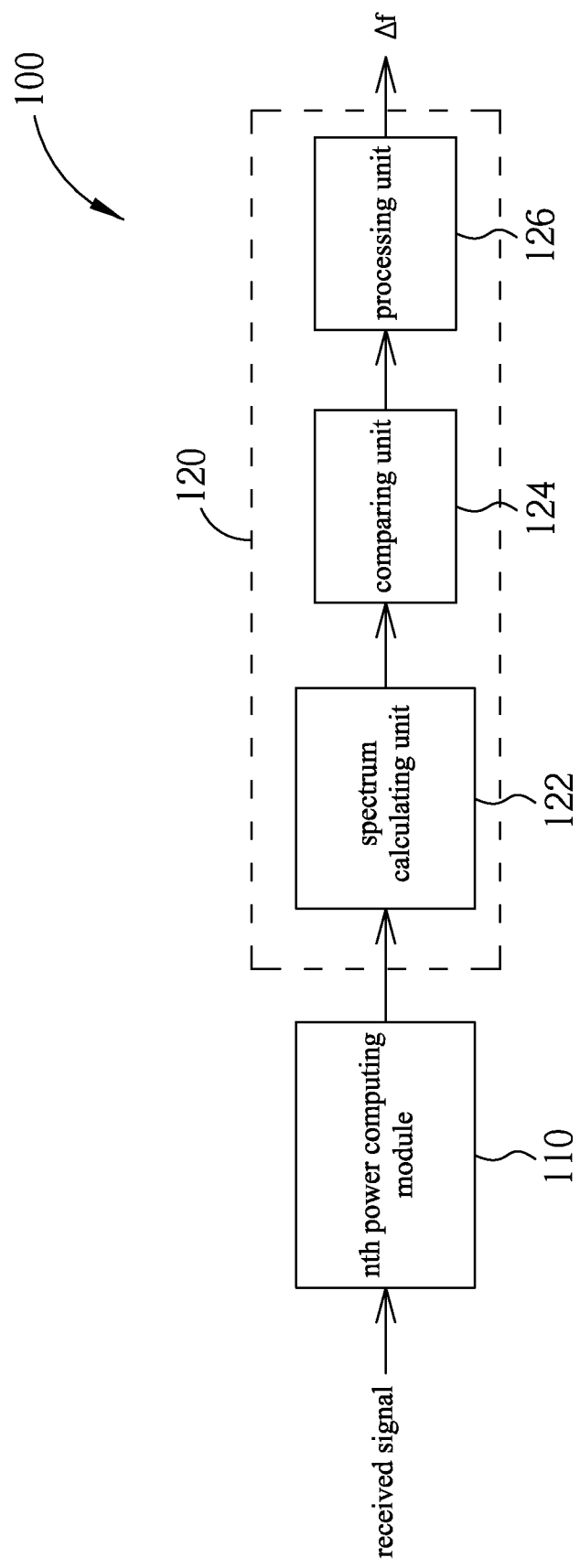
FIG. 1 is a block diagram of a frequency offset estimating apparatus according to one embodiment of the invention.

FIG. 1 shows a block diagram of a frequency offset estimating apparatus according to one embodiment of the invention. A frequency offset estimation apparatus 100 comprises an nth power computing module 110 and a spectrum analyzing module 120. The spectrum analyzing module 120 comprises a spectrum calculating unit 122, a comparing unit 124 and a processing unit 126. To estimate a frequency offset of a received signal using the frequency offset estimating apparatus 100, the nth power computing module 110 generates an nth power signal by raising the received signal to nth power. The spectrum analyzing module 120 then analyzes a spectrum of the nth power signal to obtain a frequency offset according to the frequency analysis result. Generally speaking, n is m times of 2, where n=2m and m is a positive integer. In this embodiment, n is 4 for computing the nth power of the received signal, such that modulation added to the signal at a transmitting end is eliminated. For example, four phases modulated by quadrature phase-shift keying (QPSK) are equal after computation to the $4^{th}$ power. Alternatively, for four phases modulated by quadrature amplitude modulation (QAM), a characteristic of having equal phase as described above is still available; however, certain noises that do not affect results of the subsequent spectrum analysis are present.

Figure 2:
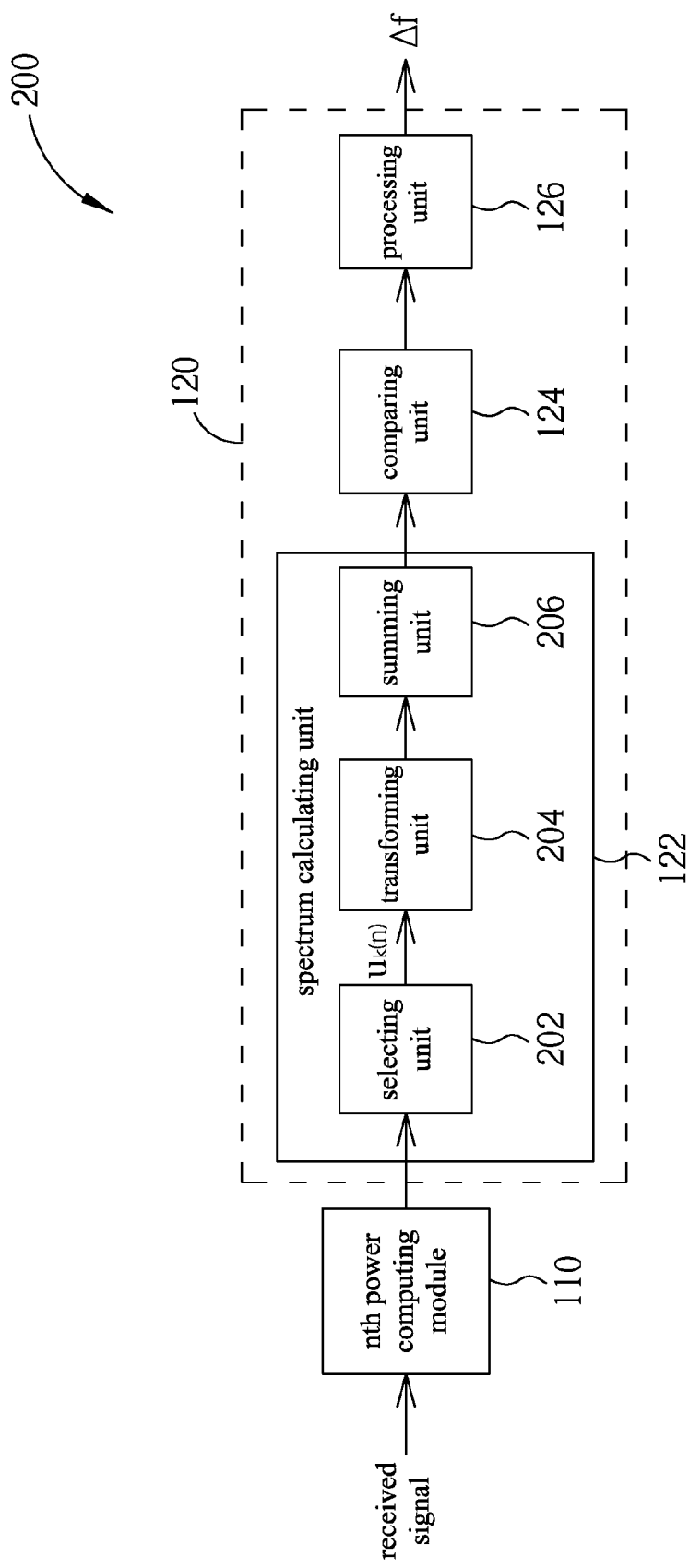
FIG. 2 is a detailed block diagram of the frequency offset estimating apparatus shown in FIG. 1.

Next, the nth power signal is transmitted to the spectrum calculating unit 122 of the spectrum analyzing module 120 to calculate a spectrum of the nth power signal. The spectrum calculating unit 122 does not limit algorithms used, and any algorithms that yield spectrum characteristics may be implemented in the present invention. In one embodiment, the spectrum calculating unit 122 calculates the spectrum according to the Baum-Welch algorithm. As shown in FIG. 2, the spectrum calculating unit 122 comprises a selecting unit 202, a transforming unit 204 and a summing unit 206. The selecting unit 202 selects K number of segments $\{u_k(n)\}_{n=1}^{N}$ each having a length of N from the nth power signal in a time domain, wherein each segment is consisted of N number of consecutive sampling points but need not be consecutively sampled from the nth power signal. The transforming unit 204 transforms the segments into a frequency domain and calculates power of each segment. The summing unit 206 adds up the power of all segments to obtain the spectrum of the nth power signal. According to this embodiment, the spectrum calculating unit 122 has advantages of having simple implementation contributable to fast Fourier transform (FFT) and no need of analysis on possible models, as well as reduced power consumption and hardware memory resources. The function of the accumulative power of K number of segments is to lower effects of noises, and thus K is not limited to be greater than one in this embodiment.

Upon obtaining the spectrum of the nth power signal, the comparing unit 124 locates a frequency value having maximum power. The frequency value is directly proportional to a frequency offset of the received signal. Therefore, the processing unit 126 adjusts the frequency value according to a scaling factor to obtain the frequency offset Δf, wherein the scaling factor is dependent on a sampling rate of the received signal.

Figure 3:
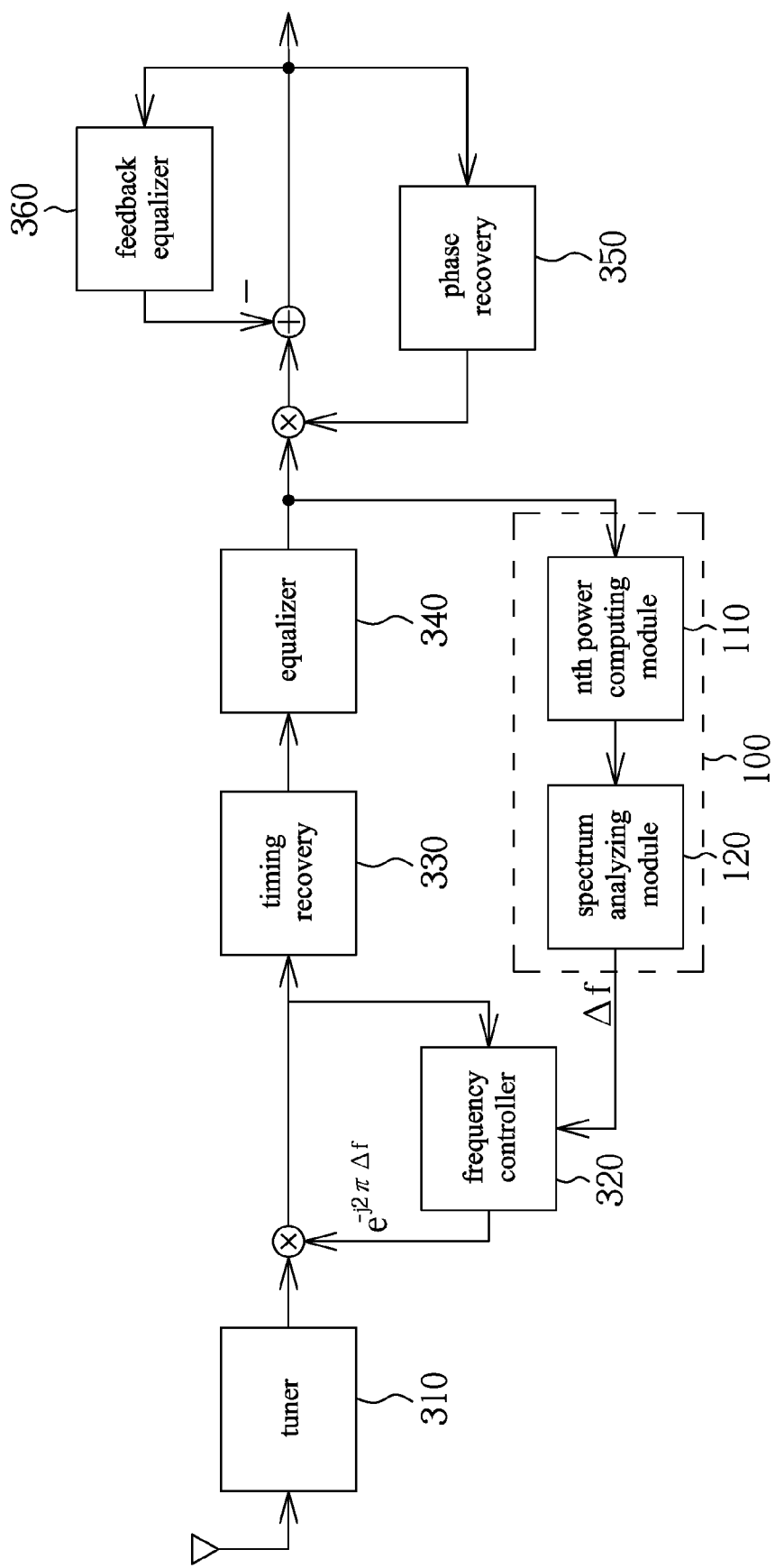
FIG. 3 is a schematic diagram showing the frequency offset estimating apparatus in FIG. 1 implemented in a DVB system according to one embodiment of the invention.

The frequency offset estimating apparatus 100 (200) may be used for but not limited to compensating frequency offset of received signals of a receiver in a communication system. To take a Digital Video Broadcasting (DVB) system for example, FIG. 3 shows a schematic diagram of the frequency offset estimating apparatus 100 implemented in a receiver of a DVB system according to one embodiment of the invention. A received signal has frequency offset after being down-converted by a tuner 310. The frequency offset estimating apparatus 100 estimates a value of the frequency offset and provides the frequency offset to the frequency controller 320 for compensating the frequency offset. In this embodiment, the frequency offset estimating apparatus 100 is coupled after a timing recovery 330 and an equalizer 340. After being processed by timing recovery and channel equalization, the received signal output from the equalizer 340 is analyzed by the frequency offset estimating apparatus 100. It is to be noted that the above configuration serves as an exemplary embodiment of the invention, and the frequency offset estimating apparatus 100 is not restricted to being coupled after the equalizer 340.

Further, during a frequency compensation mode of the receiver, a controller (not shown) may be used to start the frequency offset estimating apparatus 100 and to shut down subsequent circuits such as a phase recovery 350 and a feedback equalizer 360. When the frequency offset estimating apparatus 100 completes estimation of the frequency offset $\Delta f$, which is provided to the frequency controller 320 for compensating the frequency offset, the previously shut-down phase recovery 350 and the feedback equalizer 360 are restarted while the frequency offset estimating apparatus 100 is shut down in order to reduce power consumption. At this point, the receiver is recovered to a normal operating mode.

It is to be noted that the nth power computing module 110 and the spectrum analyzing module 120 may be realized by software means, such as a code executed by a processor. However, the invention does not limit the nth power computing module 110 and the spectrum analyzing module 120 to software. Without departing from scope of the invention, the nth power computing module 110 and the spectrum analyzing module 120 may also be implemented by hardware or a combination of software and hardware.

Conclusive from the above descriptions, the frequency offset estimating apparatus 100 (200) obtains a frequency offset of a received signals by computing the nth power of and analyzing the input signal. Compared to the conventional method using iteration for estimating frequency offset, the frequency offset estimating apparatus 100 (200) disclosed by the present invention not only provides a quicker and more accurate solution, but also is suitable for all channel environments as being unaffected by channel characteristics.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A frequency offset estimating method, implemented in a signal receiver, comprising steps of:
   generating a nth power signal by raising a received signal to nth power; and
   analyzing a spectrum of the nth power signal to obtain a frequency offset, comprising:
   calculating the spectrum of the nth power signal, comprising:
      selecting a plurality of segments from the nth power signal in a time domain;
      transforming the plurality of segments into a frequency domain and calculating power of the plurality of segments; and
      summing up the power of the plurality of segments to obtain the spectrum of the nth power signal;
   locating a frequency value with a maximum power from the spectrum; and
   obtaining the frequency offset according to the frequency value;
   wherein each of the plurality of segments comprises a plurality of consecutive sampling points in the nth power signal.

2. The method as claimed in claim 1, wherein n is a multiple of 2.

3. The method as claimed in claim 1, wherein lengths of the plurality of segments are same.

4. The method as claimed in claim 1, wherein the step of obtaining the frequency offset according to the frequency value comprises a step of:
   adjusting the frequency value according to a scaling factor to obtain the frequency offset.

5. The method as claimed in claim 1, being applied to a Digital Video Broadcasting (DVB) system, for estimating the frequency offset of the received signal of the DVB system.

6. A frequency offset estimating apparatus, comprising:
   an nth power computing module, for generating a nth power signal by raising a received signal to nth power; and
   a spectrum analyzing module, coupled to the nth power computing module, for analyzing a spectrum of the nth power signal to obtain a frequency offset, comprising:
      a spectrum calculating unit, for calculating the spectrum of the nth power signal, comprising:
         a selecting unit, for selecting a plurality of segments from the nth power signal in a time domain;
         a transforming unit, coupled to the selecting unit, for transforming the plurality of segments to a frequency domain and calculating power of the plurality of segments; and
         a summing unit, coupled to the transforming unit, for summing up the power of the plurality of segments to obtain the spectrum of the nth power signal;
      a comparing unit, coupled to the spectrum calculating unit, for locating a frequency value with maximum power from the spectrum; and
      a processing unit, coupled to the comparing unit, for obtaining the frequency offset according to the frequency value;
   wherein the selecting unit selects a plurality of consecutive sampling points from the nth power signal in each of the plurality of segments.

7. The frequency offset estimating apparatus as claimed in claim 6, wherein n is a multiple of 2.

8. The frequency offset estimating apparatus as claimed in claim 6, wherein lengths of the plurality of segments are the same.

9. The frequency offset estimating apparatus as claimed in claim 6, wherein the processing unit adjusts the frequency value according to a scaling factor to obtain the frequency offset.

10. The frequency offset estimating apparatus as claimed in claim 6, being applied to a receiver of a Digital Video Broadcasting (DVB) system, for estimating the frequency offset of the received signal.

11. The frequency offset estimating apparatus as claimed in claim 10, wherein the frequency offset estimating apparatus is turned on when the receiver operates in a frequency compensation mode; and the frequency offset estimating apparatus is turned off when the receiver operates in a normal operation mode.

* * * * *